April 4, 1967  I. B. COOPER, JR  3,312,372
SECRET CODED CARD SYSTEM
Filed May 28, 1964  3 Sheets-Sheet 1

INVENTOR.
IRVING B. COOPER JR.

BY Lindsey, Prutzman and Hayes
ATTORNEYS

April 4, 1967  I. B. COOPER, JR  3,312,372

SECRET CODED CARD SYSTEM

Filed May 28, 1964  3 Sheets-Sheet 2

INVENTOR.
IRVING B. COOPER JR.

BY Lindsey, Prutzman and Hayes
ATTORNEYS

United States Patent Office 3,312,372
Patented Apr. 4, 1967

1

3,312,372
SECRET CODED CARD SYSTEM
Irving B. Cooper, Jr., Marblehead, Mass., assignor to Veeder Industries Inc., a corporation of Connecticut
Filed May 28, 1964, Ser. No. 370,843
13 Claims. (Cl. 222—2)

This invention relates to apparatus utilized in the vending of bulk fluids and other automatic dispensing and monitoring apparatus and has particular significance to such apparatus utilizing an electromagnetic coded card reader.

It is an object of this invention to provide a vending machine capable of dispensing any desired quantiy of a divisible product such as bulk petroleum supplies at the command of a plurality of customers and to record the quantity of such products dispensed to each of the customers.

It is another object of this invention to provide a unique electromagnetic coded card reader which energizes the dispensing apparatus and selectively records the quantity of materials dispensed to each of a plurality of customers.

It is another object of this invention to provide a coded card reader of rugged design having no moving parts and requires substantially no maintenance. Included in this object is the provision of a coded card reader in which precise positioning and close proximity of the card being read to the reader does not affect its accuracy and functioning.

Another object of this invention is to provide a unique apparatus including a coded card reader for reading a code on an article passing thereby to activate a controlled circuit in response to the code applied to the card.

Another object of this invention is to provide an electromagnetic coded card reader including an E-core transformer having a novel phase reference for the signals produced by the reader. Included in this object is the provision of a card reader capable of sensing a substantially increased number of code combinations for a given number of sensing elements.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawings.

Refer now to the drawings, in which like numerals refer to like parts throughout the drawings, for the illustration of apparatus incorporating an embodiment of this invention.

Figure 1:
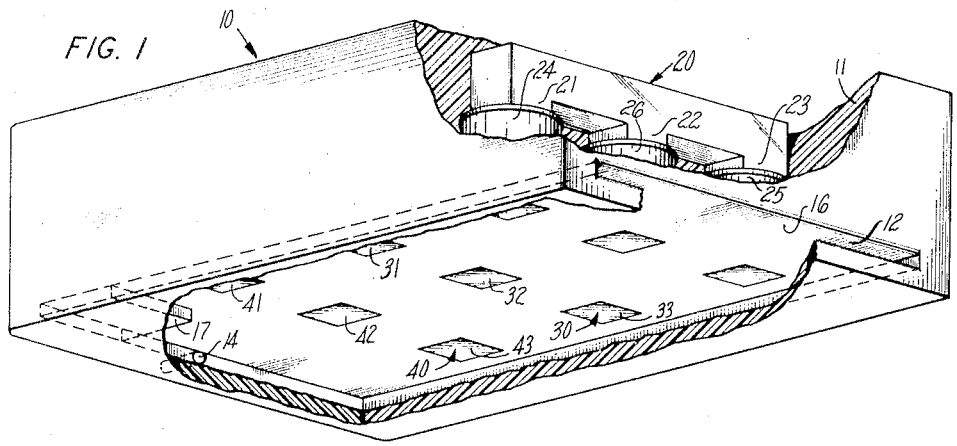
FIG. 1 illustrates one embodiment of the card reader forming part of this invention.

FIG. 1 illustrates the card reader utilizing the practice of this invention. The card reader 10 is shown as being in the form of a generally rectangular block having a narrow slot 12 in the front face thereof for receiving a coded card. If desired, a means for releasably retaining the card in operating position may be provided, and in

2 the embodiment of FIG. 1 a permanent magnet 14 is shown as being provided for this purpose. The card reader 10 includes means for reading the code imposed on the coded cards inserted in the slot 12. The reading means comprises a plurality of magnetic devices providing pairs of magnetic circuits each having legs terminating adjacent the slot 12 and means for producing flux in each magnetic circuit and for sensing a change in the flux of one of the magnetic circuits relative to the other. The identical E-core transformers 20, 30, 40 of FIG. 1 (shown as being three in number for illustrative purposes only) which are positioned in parallel alignment from the front to the back of the card reader 10 to constitute such reading means. The three poles of each of the E-core transformers are positioned adjacent the upper surface 16 of the slot 12 so as to be in close proximity to the coded cards inserted in the slot.

As shown in FIG. 1, each of the two outer legs 21, 23 of E-core transformer 20 are respectively provided with excitation coils 24, 25 which are designed to provide, when energized, equal and oppositely directed flux through the center leg 22 of the transformer 20. A secondary winding, or sensing coil, 26 is positioned around the center leg 22 of transformer 20 to detect any unbalance of flux therethrough and to provide an electric output signal in response to such unbalance.

Figure 3:
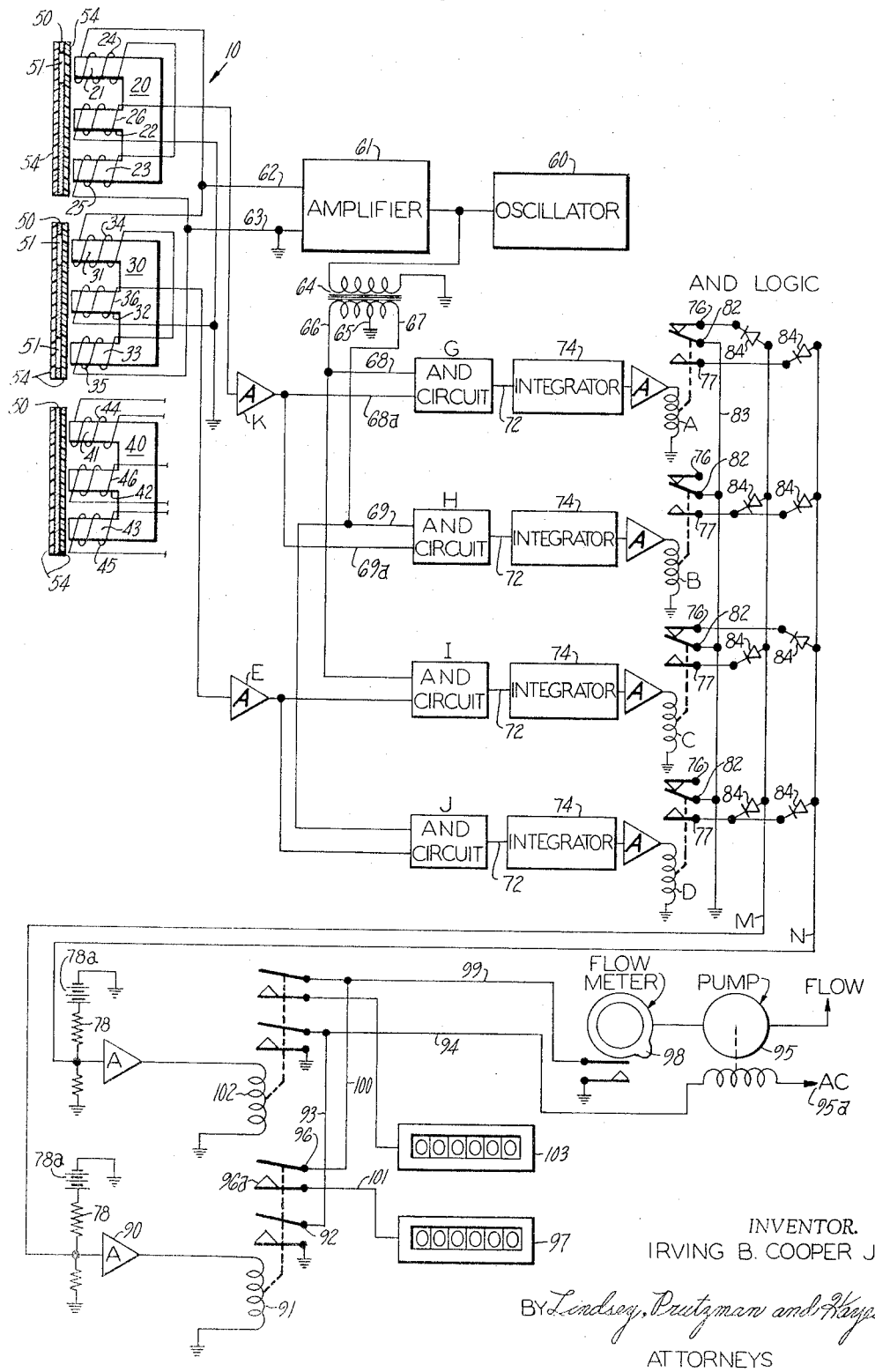
FIG. 3 is a simplified schematic diagram of a fluid dispensing system illustrating this invention.

As shown in FIG. 3, the E-core transformers 30 and 40 have like excitation windings 34, 35, 44, 45 positioned about their outer legs 31, 33, 41, 43, respectively, for producing equal and oppositely directed flux through the respective center legs 32, 42 thereof. Sensing coils 36, 46 are respectively positioned around the center legs of these transformers.

As shown in FIG. 1, the E-core transformers 20, 30, 40 and their associated windings may be potted in a suitable insulating material 11, such as an epoxy resin, to provide an explosion-proof sealed reader which is suitable for use in a contaminated atmosphere or where it would be exposed to the weather.

Figure 2A:
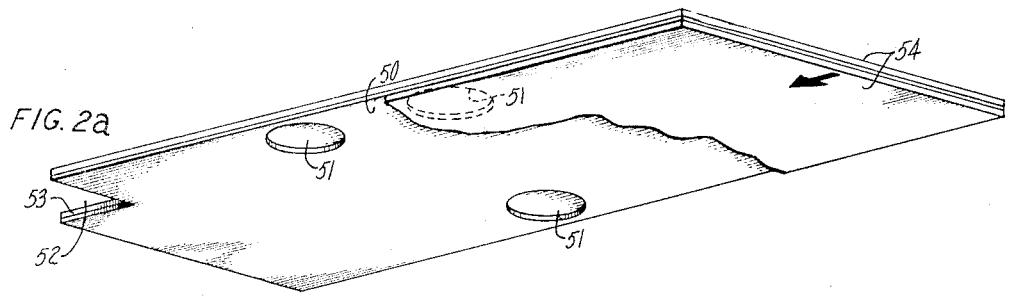
FIG. 2a shows one form of coded card for use with the card reader of FIG. 1.

In FIG. 2a there is shown a coded card 50 suitable for use with the card reader of FIG. 1. As shown, the card is formed of magnetic but nonmagnetized sheet material which may be 10 mils in thickness. The card 50 has holes 51 punched therethrough. The holes 51 are positioned on the card so as to be in coaxial alignment with selected outer legs of the E-core transformers 20, 30, 40 when the card 50 is inserted into operating position in the slot 12 of the card reader 10. The pattern of the holes 51 on the card is varied from card to card in accordance with the code identification assigned to different users or customers. The holes 51 are preferably of larger dimension than the ends of the outer legs of the E-core transformers so that when the card is positioned in operating position in the reader 10, a clearance is provided between the edge of each of the holes 51 and the associated transformer leg. In this manner, such clearances will significantly increase the reluctance of the magnetic path of the magnetic circuit in which the gap is located and may be used to produce an unbalance in the relative reluctance of the two separate magnetic paths passing through the center leg of the E-core transformer and each of the respective outer legs through the magnetic coupling provided by the card 50.

It will thus be seen that with the excitation coils 24, 25 of E-core transformer 20 providing equal and opposite flux through the center leg 22 under normal conditions when the card 50 is not within the slot, the unbalance in the magnetic reluctance produced by a single hole 51 under, say, outer leg 21 will cause the flux produced by coil 25 to exceed the flux produced by coil 24 with the result that sensing coil 26 will detect the unbalance in flux and produce an electric signal whose phase relationship is determined by that of excitation coil 25.

From the foregoing, it will be apparent that either the absence of holes coaxial with both of the outer legs of a single E-core transformer, or the presence of a pair of holes so positioned, will not unbalance the magnetic reluctance through the two flux paths provided by an E-core transformer, and thus the sensing coil on the center leg of such transformers will not produce an output signal under such conditions.

It is desirable that means be provided to prevent the card 50 from being inserted into the slot 12 in an incorrect manner and, in the illustrated embodiment, such means include the notch 52 at one of the corners of the card 50. This notch is dimensioned to receive a corner block 17 located in one of the rear corners of the slot 12. The length of the notch along the edge 53 is preferably one-half the longitudinal distance between the equally spaced E-core transformers 20, 30, 40 in the reader. In this manner, in the event that a card should be incorrectly inserted into the slot 12 none of the apertures 51 will be aligned with the legs of any of the transformers so that none of the transformers will produce a signal, and a false signal will thereby be prevented.

While it is preferable that the distance between the ends of the legs of the E-core transformers and the card 50 be minimized in order for a hole 51 to produce the greatest magnetic unbalance in a given E-core transformer, this distance is not critical and the reader has performed satisfactorily where the distance varies substantially from one card or card reader to another and the card may be loosely coupled magnetically to the E-core transformer.

In order to prevent the forging of a coded card having a specific codal hole pattern, the card 50 is preferably encased in an opaque covering 54 so that the hole pattern is not visually discernable.

The card 50 made as indicated above, except that it is formed of a nonmagnetic but electrically conductive material, may also be used with the card reader 10. The holes 51 in such a nonmagnetic card serve as a single turn secondary winding for the excitation coil of the associated transformer leg to interrupt or distort the output flux of such excitation winding.

Figure 2B:
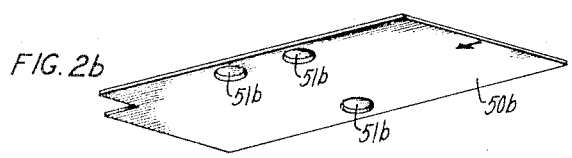
FIG. 2b shows another form of coded card suitable for use with the card reader of FIG. 1.

FIG. 2b illustrates another form of coded card which may be utilized with the card reader 10. In the card of FIG. 2b, the metallic sheet 50b is provided with pimples, or raised portions, 51b rather than the holes 51 of the card of FIG. 2a. While the illustrative code imposed on the card of FIG. 2b appears to be identical with that imposed on the card of FIG. 2a, it is, in fact, a different code since a pimple in alignment with an outer leg of an E-core transformer will decrease the air gap or clearance with the leg and hence decrease rather than increase the reluctance of the magnetic circuit therethrough. In this regard, the raised portions 51b could be depressed rather than raised in which case they would increase magnetic reluctance in the same manner as holes 51. The metallic sheet 50b could, of course, be encased in an opaque covering to conceal the code as in the case of the card of FIG. 2a.

Figure 2C:
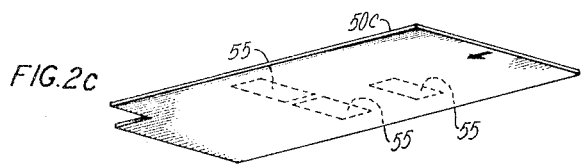
FIG. 2c shows still another form of coded card suitable for use in the card reader of FIG. 1.

FIG. 2 illustrates still another type of art which may be used with the card reader 10 of FIG. 1. In the card reader of FIG. 2c, a plurality of dots 55 formed of magnetic ink are printed or otherwise applied to a base sheet 50c formed of an electrically nonconductive material. The magnetic dots arre arranged to span the distance between the center leg and one of the outer legs of the selected E-core transformers in accordance with the code imposed on the card. It will thus be seen that the magnetic dots 55 will decrease the reluctance of the associated magnetic circuit through the E-core transformer when the card 50c is inserted in card reader 10, and the illustrative code imposed on the card of FIG. 2c is identical with that imposed on the card illustrated in FIG. 2a.

From the foregoing it will be readily apparent that the coded card reader of this invention does not involve any moving parts, or light bulbs or photoelectric cells, that require periodic maintenance or have a limited life, and the E-core transformers may be small in size so that a large number may be inexpensively made and utilized in a single reader to provide a coding system having a large combination of possible codes which would be difficult to decipher, while utilizing a card of reasonable dimensions.

Referring now particularly to FIG. 3 there is shown a simplified schematic circuit diagram of a fluid dispensing apparatus utilizing the card reader of FIG. 1. The card reader of the dispensing apparatus is shown as having three identical E-core transformers 20, 30, 40 as hereinbefore described although, for simplicity and convenience of presentation, the output circuits are shown for only two of these transformers.

The excitation windings for the transformers 20, 30, 40 are connected in parallel to a source of A.C. power such, for example, as a 150 kilocycle oscillator 60, although a sixty cycle power supply could be utilized depending on the specific characteristics required for the apparatus involved, through a power amplifier 61 and power leads 62 and 63. It will be observed that lead 63 is grounded.

An important feature of this invention is the provision of a transformer 64 having its primary winding connected between power source 60 and ground. The transformer 64 is provided with a grounded center-tapped secondary winding as indicated at 65. The two end terminals 66 and 67 of the secondary winding are connected to the input of the decoding portion system as hereinafter more fully set forth. It will be apparent that this arrangement provides, at terminals 66 and 67, a pair of electrical signals which are in-phase and out-of-phase, respectively, with the output of the power supply 60 and, in conjunction with the E-core transformers of the card reader 10, provide a means for detecting whether the hole 51 of the card 50 of FIG. 2a is positioned under, say, outer leg 21 or outer leg 23 of E-core transformer 20. The capability of discriminating between a signal produced by sensing coil 26 caused by a hole 51 under outer leg 21 from a signal caused by a hole 51 under outer leg 23 markedly increases the number of coding combinations which can be read by a card reader 10 having a given number of E-core transformers. For instance, a card reader made according to this invention but without including the transformer 64 would have the capacity for reading thirty-two code combinations. However, when the transformer 64 is utilized in the manner shown, the capacity is increased to 243 code combinations.

The sensing coils 26, 36, 46 of the E-core transformers are each connected to a pair of separate output signal detectors preferably through an amplifier. For example, sensing coil 26 is connected to input 68a of AND circuit G and to input 69a of AND circuit H through amplifier K. Sensing coil 36 of transformer 30 is similarly connected to inputs of AND circuits I and J through amplifier E.

The AND circuits may be of any conventional type and require that signals be impressed on both inputs before there is any output signal therefrom. The threshold level of the AND circuits may be established in any conventional manner so that the absence of complete phase cancellation in the E-core transformers will not produce a signal of sufficient level to trigger the AND circuits. Alternatively, a conventional resistance-capacitance circuit may be connected across each excitation winding of the transformers to obtain complete phase cancellation and their effective output voltages balanced to reduce the amplification required for the output signals of the E-core transformers. This is particularly desirable if the card shown in FIG. 2a is formed of aluminum.

In order to illustrate the operation of the code detecting system of FIG. 3, it is assumed that the coded card of FIG. 2a is placed in operative position in the card reader 10 through slot 12. The disposition of the holes 51 relative to E-core transformers 20, 30, 40 is then as schematically indicated in FIG. 3. Under these conditions, the magnetic reluctance of the two magnetic circuits in each of the E-core transformers 30 and 40 are balanced so that the sensing coils of these transformers does not deliver any output signal. The hole 51 under outer leg 21 of E-core transformer 20, however, is coaxially aligned with a hole 51 of the card 50, and the outer leg 23 of transformer 20 faces an imperforate portion of the card 50. These circumstances produce an increase in the magnetic path through the card between center leg 22 and outer leg 21 relative to that between center leg 22 and outer leg 23. Thus, the excitation coil 25 produces an excess of flux through the center leg 22 whose phase relationship is determined by excitation coil 25. The result of this condition is that the sensing coil 26 will detect the change of flux and produce an output signal which is delivered to AND circuits G and H through amplifier K. Thus, AND circuits G and H are each provided with one of the two input signals required for them to deliver an output signal and the AND circuits I and J are precluded from delivering an output circuit due to the absence of a signal from transformer 30 to one of their two inputs.

The remaining input terminal 68 of the AND circuit G is connected to the terminal 66 of the secondary of grounded center-tapped transformer 64 and the remaining input terminal 69 of AND circuit H is connected to terminal 67 of the transformer 64. It is readily apparent that either AND circuit G or AND circuit H is conditioned to fire since either terminal 68 of AND circuit G or terminal 69 of AND circuit H will be in phase with the signal from sensing coil 26. However, it is also apparent that if AND circuit G fires, AND circuit H cannot fire since the signals produced at terminals 66 and 67 are 180° out of phase and thus the input signals at inputs 69 and 69a are 180° out of phase.

When AND circuit G fires, its output 72 is fed to a relay A of the AND circuit of the apparatus. Preferably, AND circuit G is connected to relay A through an integrator 74, to smooth out the ripple in the signal, and an amplifier.

Each of the other AND circuits H, I and J are connected to associated relays B, C and D, respectively, in a similar manner. Each of the relays A, B, C and D is provided with a pair of fixed contactors 76 and 77. The center movable contactor 82 of each of these relays is connected to ground through lead 83.

The AND system includes a customer, or user, lead for each of the code combinations which is imposed on the coded cards. Two such customer leads M and N are shown in FIG. 3 for illustrative purposes. Each of these customer leads are connected to one of the leads 80 or 81 associated with each of the fixed contactors 76, 77 of relays A, B, C and D through a rectifier 84. The selection of the manner in which, say, customer line M is connected through rectifiers 84 to each of the leads 80 and 81 associated with each of the relays A, B, C, D, respectively, is determined by the code which is assigned to a particular customer. For example, the customer line M is shown as being associated with the code indicated on the coded card of FIG. 2a and customer line N is associated with a code which would fire AND circuit I only.

Assuming that AND circuit G has been fired, relay A will be energized to open circuit contactor 76 from ground (through movable contactor 82 and lead 83) and to connect terminal 77 to ground through lead 83. Under these conditions, customer lead line M is not connected to ground by any of the relays A, B, C and D and thus may carry an electric signal received from the D.C. power source 78a through curent limiting resistor 78, to deliver the signal to an amplifier 90 to energize power relay 91.

It will be readily apparent that when customer line M is connected to ground, lead 83 through the contactors 76 or 77 of any of the relays A, B, C, D, no signal voltage will be delivered to amplifier 90; it being understood that the full potential of the D.C. power source 78a will be dissipated in the voltage drop across resistors 78 under such conditions. It will also be apparent that the diodes 84 electrically isolate customer lead lines M and N so that a signal voltage on line M will not produce a voltage on lead line N.

When power relay 91 is energized, movable center contact 92 of relay 91 is connected to ground to complete the circuit through leads 93 and 94 to energize the electrically driven pump 95 from power source 95a.

The energization of power relay 91 likewise connects the movable center contact 96 to stationary contact 96a of the second set of contacts of relay 91 to connect the electrical impulse counter 97 to meter 98, which generates electrical impulses according to the quantity of fluid delivered by pump 95, through leads 99, 100 and 101.

It will be apparent that in order to discontinue the pumping of fluid by the pump 95 it is merely necessary to remove the card 50 from the slot 12 to de-energize relay A and connect customer lead line M to ground through contactor 76 of relay A so that power relay 91 is de-energized.

Briefly, it will be observed that during the foregoing operation customer lead line N is a ground potential and cannot energize power relay 102 because contactor 76 of relay C is closed. It will also be readily apparent that in order for customer lead line N to carry a signal to energize power relay 102, it is necessary that only relay C be energized which will require the use of a coded card which will energize relay C only.

Thus, it will be apparent that the fluid dispensing system illustrated by FIG. 3 provides an arrangement whereby a secretly coded card assigned to a particular customer or user may be used by the customer in self-service applications and the quantity of fluid thus delivered to each customer is recorded automatically on a counter assigned to the customer.

Figure 4:
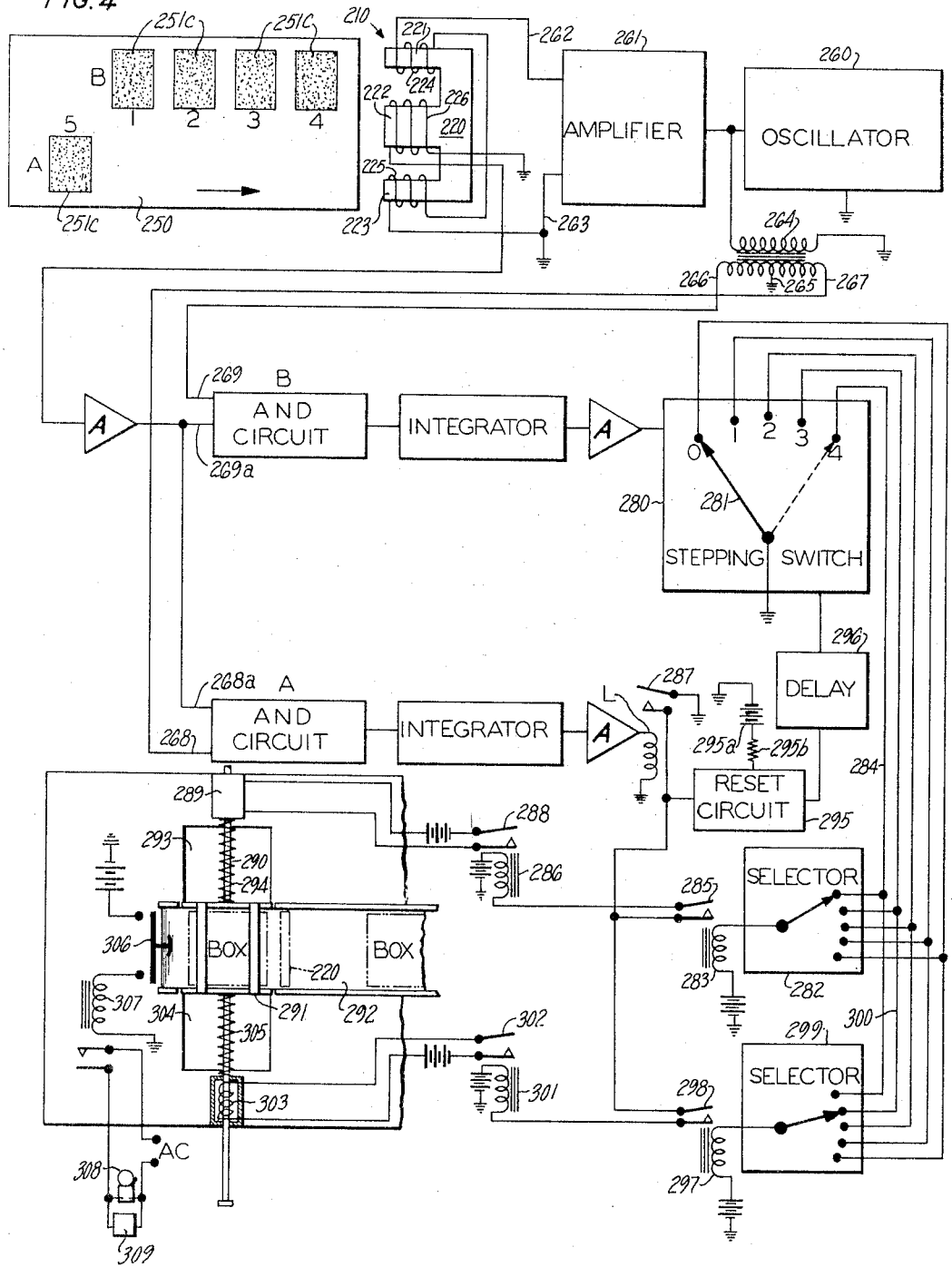
FIG. 4 is a simplified schematic diagram of a box monitoring or sorting system incorporating this invention.

Referring now to FIG. 4, there is illustrated a box sorting and monitoring apparatus incorporating this invention.

In this application of the invention, a card 250 formed of an electrically nonconducting material having a plurality of magnetically conducting ink spots 251c is moved passed the card reader 210 which is in the form of a single E-core transformer 220 having outer legs 221 and 223 and a center leg 222. The outer elgs are provided with excitation windings 224 and 225, respectively, which are connected to the power supply 260 preferably through an amplifier 261 and power leads 262 and 263, the latter of which is grounded. The excitation coils 224 and 225 are designed to provide euqal and oppositely directed flux through the center leg 222 of transformer 220. A sensing coil 226 is wound around the center leg 222 of the transformer to detect any change in flux passing therethrough and to produce an output signal upon any unbalance in the reluctance between the magnetic circuit formed by the center leg 222 and each of the outer legs 221 an 223 respectively.

The output is fed through an amplifier to input circuits 268a and 269a of AND circuits A and B respectively.

The embodment of FIG. 4 includes a transformer 264 having a grounded center tap secondary winding 265 to provide phase reference signals in the same manner as hereinbefore described in connection with FIG. 3. The end terminals 266 and 267 are connected to the second inputs 268 and 269 of the AND circuits A and B respectively. The output of AND circuit B is fed into a stepping switch ably through an integrator and an amplifier as shown. The output of AND circuit B is fed into a stepping switch 280 preferably through an integrator and an amplifier as shown. The capability of the E-core transformer code sensor or card reader is particularly useful in a box monitoring and sorting system since the card 250 is normally applied to the top of a box which inherently does not have precise dimensions. Since the coded card 250 may be left on the box at the completion of the monitoring procedure, it is desirable to conceal it by placing it under the top cover of the box. This further limits the possibility of a close coupling of the code markings 251c with the code reader as heretofore required for code readers used in such applications.

The box carrying the coded card 250 is normally moved down a conveyor under the E-core transformer 220 with specific code markings such as the four magnetic dots printed on the card 250 as shown in FIG. 4. It will thus be apparent that as magnetic dot 1 passes the E-core transformer 220 it will unbalance the magnetic reluctance of the two magnetic paths through the transformer with the result that sensing coil 226 will produce an electric signal which is fed into the inputs 268a and 269a of AND circuits A and B respectively. In this embodiment of the invention, the phase reference signals produce by transformer 264 are arranged so that the signal produced as magnetic dot 1 passes under the E-core transformer 220 will fire AND circuit B.

The result of the firing of AND circuit B is that the movable contact arm 281 of stepping switch 280 will move one step to the right as shown in FIG. 4 to engage the contact 1 of stepping switch 280. In a similar manner, magnetic dots 2, 3, and 4 of card 250 will each fire AND circuit B and will accordingly each advance stepping switch 280 one step so that after all four magnetic dots have passed under the E-core transformer, the movable arm 281 will be in the position shown in dotted lines in FIG. 4.

Contact 4 of stepping switch 280 is connected to a contact of the manual selector 282 through lead 284. With manual selector 28 adjusted as indicated, its associated relay 283 is energized through selector 282, lead 284, and movable contact arm 281 of the stepping switch 280 to ground. This closes the contacts 285 of relay 283 and conditions the control circuit for power control relay 286 for energization if AND circuit A should fire to energize relay L to close its contacts 287 and complete the control circuit through relay 286 to ground.

The code imposed on card 250 is the one selected to conform with the setting of manual selector 282 and it will be observed that single magnetic dot 5 passes under the E-core transformer 220 to fire AND circuit A to energize relay L with the monitoring circuit conditioned to energize power control relay 286.

The energization of relay 286 may be utilized in any suitable manner to indicate the acceptance or rejection of the box passing under the E-core transformer 220. In the embodiment shown, it will be observed that the energization of the power control relay 286 closes relay switch 288 to energize power solenoid 289. Power solenoid 289 is shown schematically as being connected through actuating rod 290 to box-directing mechanism 291 of the conveyor 292 and the energization of solenoid 289 causes the box-directing mechanism 291 to move laterally so that the monitored box having the correct code marking is moved to discharge opening 293 in the conveyor.

For purposes of illustration, the E-core transformer 220 is shown in dotted lines above the conveyor 292 and box-directing mechanism 291 which is shown schematically and on a reduced scale for illustrative purposes includes a return spring 294 to return the box-directing mechanism 291 to its normal position after the box is directed through discharge opening 293 and contacts 287 of relay L have opened.

When relay L is energized to complete the circuit to ground through contacts 287, it will also close the circuit to ground for a reset circuit 295 which, after a time delay provided by delay circuit 296, will reset the stepping switch 280 so that the movable arm 281 again assumes a position shown in FIG. 4. The A.C. voltage source 295a is connected through a current limiting resistor 295b which is provided to develop the necessary signal to trigger the reset circuit 295. Thus, the apparatus of FIG. 4 is again conditioned to monitor another box passing down the conveyor 292 which will duplicate the operation of the apparatus if it includes a code the same as shown on card 250 of FIG. 4.

The apparatus of FIG. 4 also provides for the simultaneous monitoring and sorting of boxes having other codes. For example, a box provided with three longitudinally spaced magnetic dots instead of four as shown on card 250 of FIG. 4 would fire AND circuit three times to move the arm 281 of stepping switch 280 so that it would be in engagement with contact 3 thereof. Thus with the manual selector 299 set as indicated, the circuit for selector relay 297 would be completed through manual selector 299, lead 300 and movable contact 281 of stepping switch 280 to close contacts 298. Power control relay 301 would then be conditioned for energization through selector relay contacts 298 and contacts 287 upon magnetic dot 251c passing under outer leg 223 of E-core transformer 220 to fire AND circuit A and energize relay L. Relay contacts 302 would thus be closed to energize power solenoid 303 to move the box-directing mechanism 291 downwardly as viewed in FIG. 4 so that the box so coded is discharged through opening 304.

Return spring 305 moves the box-directing mechanism 291 back to its normal position astride the conveyor 292 after relay L contacts 287 open. The stepping switch 280 operates in the same manner as described above to condition the system for monitoring another box.

The monitoring system of FIG. 4 will detect an improperly coded box since an improper code passing the detector would cause AND circuit A to fire relay L when the position of stepping switch 280 did not match one of the selectors connected thereto. Under such conditions neither power control relay 286 nor power control relay 301 will be energized and the box-directing mechanism 291 will not be operated. Such an incorrectly coded box will therefore proceed down the conveyor and, if desired, a switch 306 may be provided to energize a relay 307 which closes the circuit to an alarm such as bell 308 and to de-energize the conveyor drive system 309. After the rejected box is removed, the conveyor drive system 309 may be manually reset for further operation.

It will be apparent that an improperly coded box in triggering the AND circuit A and energizing relay L to close contacts 287 would also trigger the reset circuit 295 to reset stepping switch 280 for monitoring the next box.

Moreover, it is apparent that an uncoded box would be rejected since it would not trigger either AND circuit A or AND circuit B but would engage switch 306 to de-energize the conveyor system as indicated above.

In the monitoring system of FIG. 4, the AND circuit B and its associated integrator and phase input signal at 269 may be eliminated if desired since AND circuit A will detect the relative lateral position of magnetic dot 5 on the card 250 as required for triggering the reset mechanism for stepping switch 28 and activating the box directing mechanism 291.

As will be apparent to persons skilled in the art, various modifications and adaptations of the structure above described will become readily apparent without departure from the spirit and scope of the invention, the scope of which is defined in the appended claims.

I claim:

1. A coded card reader having an A.C. power supply and including an E-core transformer having a center leg and a pair of outer legs for providing two magnetic flux paths including the center leg in common, a flux sensing coil on said center leg and excitation windings for producing equal flux in each of the magnetic flux paths, said flux being oppositely directed in the center leg of the transformer, and a second transformer energized by said power supply in parallel with the E-core transformer, said second transformer having a secondary winding to produce signals responsive to the phase variations of the power supply to provide a reference for the polarity of any signal produced by said sensing coil upon the distortion of the flux in one of the magnetic flux paths relative to the other.

2. A coded card reader having an A.C. power supply and including transformer means providing a pair of magnetic flux paths, means for producing flux in each of the flux paths and means for detecting a relative change in the flux of one of the flux paths with respect to the other, a second transformer energized by said power supply in parallel with said transformer means, said second transformer having a secondary winding to produce signals responsive to the phase variations of said power supply to provide a reference for the polarity of any signal produced by said detecting means, upon the distortion of the flux in one of said flux paths relative to the other and a pair of AND circuits each connected to the output of the secondary of said second transformer and to the output of said detecting means for actuating a driven device in response to said flux distortion.

3. A coded card reader having an A.C. power supply and including a plurality of E-core transformers each having a center leg and a pair of outer legs for providing two magnetic flux paths including the center leg in common, a flux sensing coil on the center leg and excitation windings for producing equal flux in the two magnetic paths of each of the E-core transformers, said flux being oppositely directed in the center leg thereof, a second transformer energized by said power supply in parallel with the excitation windings of the E-core transformers, said second transformer having a grounded center-tapped secondary winding to produce signals responsive to the phase variations of the power supply to provide a reference for the polarity of any signal produced by the sensing coil of each of the transformers upon the distortion of the flux in one of the magnetic paths of such transformer relative to the other magnetic path thereof, and means for placing the coded card adjacent the card reader with codal areas of different magnetic reluctance coupling the center leg with the outer legs respectively of at least some of the transformers to produce signals indicative of the code imposed on the card.

4. A coded card reader having an A.C. power supply and including a plurality of E-core transformers each having a center leg and a pair of outer legs for providing two magnetic flux paths including the center leg in common, a flux sensing coil on the center leg and excitation windings for producing equal flux in the two magnetic paths of each of the E-core transformers, said flux being oppositely directed in the center leg thereof, a second transformer energized by said power supply in parallel with the excitation windings of the E-core transformers, said second transformer having a grounded center-tapped secondary winding to produce signals responsive to the phase variations of the power supply to provide a reference for the polarity of any signal produced by the sensing coil of each of the transformers upon the distortion of the flux in one of the magnetic paths of such transformer relative to the other magnetic path thereof, and a pair of AND circuits each having an input connected to each of said sensing coils, the AND circuits each further having a second input connected to one of the terminals of the secondary winding of the second transformer whereby the AND circuits are triggered in response to the code imposed on the coded card.

5. A vending machine for dispensing bulk fluids comprising a pump for pumping the fluids, a meter for measuring the fluids discharged by the pump, a plurality of counters selectively connected to said meter for recording the fluids pumped and means for selectively connecting each of said counters with the meter and for energizing the pump comprising a coded card reader having an A.C. power supply and including a plurality of E-core transformers each having a center leg and a pair of outer legs for providing two magnetic flux paths including the center leg in common, a flux sensing coil on the center leg and excitation windings for producing equal flux in the two magnetic paths of each of the E-core transformers, said flux being oppositely directed in the center leg thereof, a second transformer energized by said power supply in parallel with the excitation windings of the E-core transformers, said second transformer having a grounded center-tapped secondary winding to produce signals responsive to the phase variations of the power supply to provide a reference for the polarity of any signal produced by the sensing coil of each of the transformers upon the distortion of the flux in one of the magnetic paths of such transformer relative to the other magnetic path thereof, and electric circuit means responsive to the signals produced by the sensing coils in accordance with a card applied to the reader for selectively connecting each of the counters with the meter and for energizing the pump.

6. A vending machine for dispensing bulk products, a meter for measuring the quantity of products dispensed, a plurality of counters selectively connected to the meter for indicating the products dispensed, and means for selectively connecting each of the counters with the meter comprising transformer means providing a plurality of pairs of magnetic flux circuits, means for producing flux in each of the flux circuits and for sensing a change in the flux of one of the flux circuits of each pair relative to the other, and a coded card having means for changing the relative flux in the flux circuits of at least some of the pairs of magnetic circuits to produce a set of signals corresponding to the specific code imposed on the card, and means responsive to the set of signals for dispensing the bulk products and connecting a preselected counter to the meter.

7. A vending machine as set forth in claim 6 including a phase detector for producing signals responsive to the phase variations of the power supply to provide a reference for the polarity of any signal produced by the sensing means.

8. A vending machine as set forth in claim 7 wherein the signal responsive means for dispensing the bulk products includes a plurality of pairs of AND circuits with an input of each of the AND circuits in each pair being connected to the sensing means for a pair of magnetic flux circuits and the other input of each of said AND circuits in each pair being connected to the phase detector.

9. A vending machine for dispensing bulk products comprising means for delivering the products, a meter for measuring the quantity of products delivered, a plurality of counters selectively connected to said meter for registering the products delivered and means for selectively connecting each of the counters with the meter and for energizing the delivery means at the command of a self-service operator having a coded card comprising, a coded card reader having an A.C. power supply and including a plurality of E-core transformers each having a center leg and a pair of outer legs for providing two magnetic flux paths including the center leg in common, a flux sensing coil for detecting flux changes in the center leg and excitation windings for producing equal flux in the two magnetic paths of each of the E-core transformers, said flux being oppositely directed in the center leg thereof, and a phase detector for indicating the phase relationship of any signal produced by the sensing coil of each of the transformers upon the distortion of the flux in one of the magnetic paths of such transformer relative to the other magnetic path thereof upon the insertion of the coded card into the coded card reader.

10. A detecting system including a code reader having transformer means providing a pair of magnetic circuits, means for producing flux in each magnetic circuit, sensing means for detecting a change in the flux in one magnetic circuit relative to the other, a phase detector, a stepping switch, means for advancing the stepping switch for each signal of a given phase from the sensing means, a relay, means for energizing the relay upon a signal of the opposite phase from the sensing means, and driven means responsive to the codes imposed on a device passing the code reader.

11. A device as set forth in claim 10 wherein said relay actuates a reset circuit for the stepping switch to prepare the system for monitoring the next succeeding device.

12. A device as set forth in claim 11 including a plurality of manual selectors electrically connected to the stepping switch whereby the system can monitor devices having different codes imposed thereon.

13. A monitoring and rejection system for boxes having magnetic codes imposed thereon comprising a card reader having an E-core transformer having a center leg and a pair of outer legs for providing two magnetic flux paths including the center leg in common, a flux sensing coil on said center leg and excitation windings for producing equal flux in each of the magnetic flux paths, said flux being oppositely directed in the center leg of the transformer, and a second transformer energized by said power supply in parallel with the E-core transformer, said second transformer having a secondary winding to produce signals responsive to the phase variations of the power supply to provide a reference for the polarity of any signal produced by said sensing coil upon the distortion of the flux in one of the magnetic flux paths relative to the other, a stepping counter operative in response to signals of one polarity from the sensing coil, a relay operative in response to signals of the opposite polarity from the sensing coil, a manually adjustable selector having a relay energizable by said stepping switch, the output terminals of said relays being connected in series circuit relationship with a driven device operable to accept or reject a box having a code thereon corresponding to the setting of the manually adjustable selector.

References Cited by the Examiner

UNITED STATES PATENTS

| | | | |
|---|---|---|---|
| 2,792,148 | 5/1957 | Goldenberg | 222—2 |
| 2,926,844 | 3/1960 | Devol. | |
| 3,034,634 | 5/1962 | Brand et al. | 198—38 |
| 3,087,598 | 4/1963 | Clore | 198—38 |
| 3,171,104 | 2/1965 | Norton et al. | |
| 3,203,591 | 8/1965 | Daulton et al. | 222—2 |

FOREIGN PATENTS

| | | |
|---|---|---|
| 152,433 | 7/1953 | Australia. |
| 519,553 | 12/1955 | Canada. |

ROBERT B. REEVES, *Primary Examiner.*

CHARLES R. CARTER, *Examiner.*

K. N. LEIMER, *Assistant Examiner.*